United States Patent [19]

Presby

[11] Patent Number: 5,429,752
[45] Date of Patent: Jul. 4, 1995

[54] MEANS FOR PRECIPITATING OUT SUSPENDED SOLIDS IN SEPTIC TANK LIQUIDS

[76] Inventor: David W. Presby, P.O. Box 617, Sugar Hill, N.H. 03585

[21] Appl. No.: 17,862

[22] Filed: Feb. 16, 1993

[51] Int. Cl.⁶ ............................................. B01D 21/02
[52] U.S. Cl. .................................. 210/802; 210/521; 210/532.2
[58] Field of Search ............ 210/150, 151, 521, 532.1, 210/532.2, 519, 615, 702, 801, 802

[56] References Cited

U.S. PATENT DOCUMENTS

| | | | |
|---|---|---|---|
| 2,119,013 | 5/1938 | Kerns et al. | 210/521 |
| 2,868,384 | 1/1959 | Puddington | 210/521 |
| 3,399,135 | 8/1968 | Conley, Jr. et al. | 210/521 |
| 3,460,677 | 8/1969 | Fifer | 210/521 |
| 4,722,800 | 2/1988 | Aymong | 210/521 |
| 5,096,579 | 3/1992 | Jordan et al. | 210/150 |
| 5,266,191 | 11/1993 | Greene et al. | 210/521 |

FOREIGN PATENT DOCUMENTS

| | | |
|---|---|---|
| 2452950 | 12/1980 | France . |
| 555806 | 7/1932 | Germany . |
| 2852966 | 10/1979 | Germany . |
| 4017229 | 12/1990 | Germany . |

*Primary Examiner*—Christopher Upton
*Attorney, Agent, or Firm*—George W. Dishong

[57] ABSTRACT

This invention most generally relates to a method of and a device/apparatus for use in precipitating out suspended solids, particularly those found in septic tanks, and having the particular objectives, features and advantages of: 1) Special formed collection and support structure which will not restrict or inhibit the flow-through of liquid in a septic tank; 2) Liquid flow directing devices causing undulating and directed liquid flow; 3) Compatibility with existing septic tanks; 4) Collection panels with collection surfaces with-current and counter current to liquid flow within the tank and permitting cross current flow-through of the panels; 5) Special structure adaptable to be easily removed and cleaned. Even more particularly, the invention is directed to a septic tank maze apparatus comprising means for causing the incoming liquid having the suspended materials suspended therein to flow in an undulating path in a direction substantially parallel to collection surfaces of collection panels. The suspended solids collect, at least in part, simply due to contacting the panel collection surface. The collection panels collection surfaces have perforations therethrough to allow for minimal perpendicular flow (higher resistance path) through of liquid and also to reduce the surface area of the collection surface resulting in the dislodging of the collected solids when the mass becomes substantially large. The globules—the locally accumulated collected solids—will either fall from the collection surface to the bottom of the septic tank or will float off and remain in the tank and not outflow into the leach system. More particularly, the collection panels are preferably used in multiples within the septic tank and have flow directing openings located in a manner so as to cause the liquid flow to be undulating through the septic tank from the inflow to the outflow. There is also provided means for keeping the collection panels optimally located within the septic tank.

19 Claims, 6 Drawing Sheets

MEANS FOR PRECIPITATING OUT SUSPENDED SOLIDS IN SEPTIC TANK LIQUIDS

BACKGROUND OF THE INVENTION

1. Field of the Invention

This invention most generally relates to a method of and a device/apparatus for use in precipitating out—not filtering out—suspended solids, particularly those found in septic tanks, and having the particular objectives, features and advantages of: 1) Special formed collection panels and support structure which will not restrict or inhibit the flow-through of liquid in a septic or treatment tank; 2) Liquid flow directing devices which define a low resistance flow path and cause undulating and directed liquid flow; 3) Compatibility with existing septic tanks; 4) Collection panels with collection surfaces which are oriented to be parallel to low resistance flow path current and the counter current flow path of the liquid flow within the tank and permitting a higher resistance flow path which is a cross current flow-through of the panels; and 5) Specially structured or adapted to be easily removed and cleaned.

Even more particularly, the invention is directed to a septic tank maze apparatus comprising means for causing the incoming liquid, or flowable composition which may have solid waste, and having the suspended materials suspended therein to flow in an undulating path in a direction substantially parallel to collection surfaces of collection panels. The suspended solids collect, at least in part, simply due to contacting the panel collection surface and due, it is believed, to turbulence created in the zone or region proximate to the collection panel surfaces. The collection panels collection surfaces have perforation therethrough to allow for minimal perpendicular flow (higher resistance path) through of liquid and also to reduce the surface area of the collection surface resulting in the dislodging of the collected solids when the mass becomes substantially large. The globules—the locally accumulated collected solids—will either fall from the collection surface to the bottom of the septic tank or will float off and remain in the tank and not outflow into the leach system. More particularly, the collection panels are preferably used in multiples within the septic tank and have flow directing openings located in a manner so as to cause the liquid flow to be undulating through the septic tank from the inflow to the outflow. There is also provided means for keeping the collection panels optimally located within the septic tank.

2. Description of the Prior Art

Suspended solids have plagued the septic system industry more in the last ten (10) or more years than in previous years. The increase in the problems is due in substantial part to the evolution and development of some of the modern day cleaners now make cleaning easier in that they cause grease and oil to dissolve into the water. The major problem with the septic tank is that the suspended solids in passing through the tank neither cool nor make contact at a slow enough pace to separate from the water.

Lint and fuzz has also been an ongoing problem for the septic tank to control. This material stays suspended in the septic tank liquid and normally passes through remaining suspended in the effluent which subsequently also causes problems in the leach system connected with the septic tank.

Presently there is nothing available that provides for the removal, in a manner which does not effect the cost and the performance characteristics of the septic treatment system, of suspended solids that are typically found in septic tank liquid. It is important that the suspended solids do not leave the treatment tank to adversely affect the subsequent treatment of the waste water/effluent. A leach field, for example, is adversely effected because the suspended solids will clog drains openings and also adversely affect the absorption characteristics of the leach bed.

Currently there are designs and equipment that attempt the removal of the suspended solids. All of those known to the inventor of the present precipitation apparatus have failed to address the problem in an efficient manner because all the efforts attempt to "filter" the liquid. Filtration creates an additional set of problems. The filters can quickly become plugged slowing down or completely blocking the flowthrough of the liquid through the treatment tank. The filters are expensive and are costly to maintain.

It would be advantageous to have a treatment system which would, without a large expense, keep suspended solids from exiting the treatment tank, would not require any additional maintenance, would be incorporatable into standard septic tank and other treatment tank configurations without changing the geometry and the structure of the tanks, would be easily installed into existing and in-place tanks and which would provide flexibility to incorporate a variety of component geometries, component materials and orientations to result in a custom system based upon special or specific needs within the treatment system.

There nothing currently available which satisfies these needs and objectives. However, the invention disclosed herein does meet all of these objectives. This invention is not a filter system. Filtering has not been found to be effective and also has been found to be too difficult and costly to maintain.

After reviewing patents which were developed in a search, no structure or method for precipitating suspended solids out of the composition flowing into a septic or other treatment tank similar to the present invention was found nor was one suggested. None of the prior art known to the inventor hereof satisfies the need for removing from effluent solids which are suspended in the liquid of a septic tank in an effective and high quality, simple and economically feasible way. No one has considered the advantages of precipitating the suspended solids onto collection surfaces. The precipitated solids there form globules which then ultimately fall to the bottom of the treatment tank or float to the surface and most importantly stay in the tank for future removal by pumping. The suspended solids do not get into the leach field or into a subsequent processing stage thereby keeping the leach system more effective for a longer period of time.

The following patents relate to the technology of the present invention but none of them meets the objects of the septic tank maze in a manner like that of the instant invention. Neither are any of them as effective and as efficient as the instant septic tank maze.

There are patents which disclose complicated systems for pollution control, sewage treatment plant, recycling of flush water and filtration of maple sap to Bertelson U.S. Pat. No. 4,116,835—separation from aqueous effluents using a system which includes means for introducing the contaminated fluid into a separation zone where they are passed through the labyrinth course of a coalescing chamber to separate oil particles. etc.—, Jensen U.S. Pat. No. 4,992,165—sewage treatment plant comprising "mixed biomass" which attaches itself to a plurality of free draining media surfaces that are alternately exposed and submerged—, Oshima et al U.S. Pat. No. 4,933,076—a flushing water-circulation system—, and Heyer 3,912,533—an apparatus for removing maple sugar sand from maple sap —). All of these patents teach filters which are cross current and not with-current or counter-current. Filtration is fundamental to all of them.

Additional to the above noted patents, to; Mayo U.S. Pat. No. 1,485,623, Graham U.S. Pat. No. 4,325,823, and Warner U.S. Pat. No. 4,997,562 all are directed to wastewater treatment septic tank apparatuses. However, each one of these clearly teaches advantages to cross current devices that is, devices which intercept the effluent flow rather than a device or plurality of devices which collect solids and which are with-current and/or counter-current oriented within the septic tank. Compartments are created which are serially juxtaposed so that all of the effluent passes through, sequentially, each of the compartments. Partitions are taught and not collection panels.

United States Patent to Williams U.S. Pat. No. 3,202,285, teaches primarily aerobic and anaerobic bacterial actions for the treatment of sewage. But, much of the sewage which is treated by aerobic bacteria action is not treated to any appreciable extent by anaerobic bacteria action.

United States Patent to Anderson U.S. Pat. No. 4,319,998, teaches a monitor for an effluent disposal system for preventing suspended solids in an effluent from clogging a disposal field. The kernel of this invention appears to be the separate monitor.

The patents noted herein provide considerable information regarding the developments that have taken place in this field of technology. Clearly the instant invention provides many advantages over the prior art inventions noted above. Again it is noted that none of the prior art meets the objects of the septic tank maze in a manner like that of the instant invention. None of them as effective and as efficient as the instant septic tank maze.

SUMMARY OF THE INVENTION

The present invention in it's-most simple form or embodiment is directed to a method of and a device/apparatus, frequently referred to herein as a septic tank maze, for use in precipitating out—not filtering out—suspended solids, particularly those found in septic tanks. A collection panel, but preferably a number of collection panels, are assembled onto a frame. The frame is preferably made of plastic tubing and is sized and configured to fit within a septic tank or other treatment tank. The collection panels are assembled onto the frame structure at positions and in orientations which are predetermined to be most effective to precipitate out the types of suspended solids typically found in the incoming liquid to the treatment tank. The collection surface of the collection panels may all have the same texture and same sized apertures in the mesh or each of the panels may have different texture and mesh types or sizes. However, the optimum designed embodiment of the precipitation apparatus may be easily produced and installed.

An object of the invention is to provide a suspended solids precipitation apparatus easily and economically maintainable and which is effective to remove solids suspended in liquid inflowing to a septic tank or treatment tank and cause them to remain in the tank for removal by conventional pumping thereby making a conventional septic tank more efficient and more effective.

A further object of the invention is to provide a suspended solids precipitation apparatus which is easily and economically adaptable to meet specific design criteria which are based upon types and quantity of suspended solids found or expected in a treatment system and which when in use, will increase the life expectancy of a leaching system and reduces the normal area of a leach system.

A still further object of the invention is to provide a suspended solids precipitation apparatus which because of its use reduces ground water contamination.

A primary object of the invention is to provide a suspended solids precipitation apparatus adapted to be removably placeable within a sewage and wastewater treatment tank. The precipitation apparatus when placed within the treatment tank, causes substantial amounts of suspended solids within liquid inflowing, at an inflow end, which has an inflow aperture, into the treatment tank to remain within the tank thereby substantially reducing an amount of suspended solids outflowing, at an outflow end from the treatment tank. The precipitation apparatus comprises: at least one collection panel, but preferably a plurality of collection panels each having two back-to-back collection surfaces, each of the collection surfaces has a surface texture which promotes the precipitation thereon of the suspended solids; a means for holding in a substantially predetermined and subsequently fixed location and orientation each of the at least one collection panel or preferably plurality of collection panels such that the collection surfaces are substantially parallel to a liquid flowthrough direction. The liquid flowthrough direction is defined by a direction line connecting the inflow aperture to the outflow aperture, and wherein the at least one located and oriented collection panel defines a plurality of precipitation chambers when the precipitation apparatus is placed within the treatment tank. The at least one collection panel is so oriented, by the means for holding, so as to permit flow through of the liquid in the liquid flowthrough direction from the inflow end to the outflow end of the treatment tank and the precipitation of the suspended solids onto the collection surfaces.

Another primary object of the invention is to provide the suspended solids precipitation apparatus with an inlet end flow directing member removably attached to an inlet end of the means for holding and having defined therethrough an inlet flow directing aperture. The inlet flow directing aperture is located to direct the liquid having the suspended solids into at least one precipitation chamber of the plurality of precipitation chambers. The inlet end flow directing member and the inflow end of the treatment tank defining an input chamber when the precipitation apparatus is placed within the treatment tank.

Yet another primary object of the invention is to provide the suspended solids precipitation apparatus with an outlet end flow directing member removably attached to an outlet end of the means for holding, having defined therethrough an outlet flow directing aperture. The outlet end flow directing member and the outflow end of the treatment tank defines an output chamber when the precipitation apparatus is placed within the treatment tank. The outlet flow directing aperture is located to direct the liquid into the output chamber.

A further object of the invention is to provide the suspended solids precipitation apparatus wherein the texture of the collection surfaces is a mesh having a plurality of apertures therethrough, said apertures each having a selected area measure. The area measure selected is a function of material characteristics of the suspended solids. The mesh may be selected from at least one of the materials selected from the group consisting of nylon mesh, metallic mesh, plastic mesh, fiberglass mesh, fabric mesh, woven wood and plastic or any other suitable material.

A still further object of the invention is to provide the suspended solids precipitation apparatus wherein the means for holding, be preferably a plastic tube frame assembly/structure, and that a plurality of collection panel be assembled thereon. Spacer members and a plurality of leg members are also included. The leg members and spacer members are adapted to locate and maintain the location of the collection panel or the number of collection panels relative to each other and positioned and oriented within the treatment tank.

A yet still further object of the invention is to provide the suspended solids precipitation apparatus wherein the means for holding orients each of the collection panels (where more than one is used) in a manner such that the collection surfaces are substantially vertical to a bottom surface of the treatment tank and each adjacent collection panel has a flow directing aperture therethrough located preferably at alternative ends of the panels thereby creating an undulating liquid flow path such that the direction of the liquid current at one collection surface is counter current to the direction of the liquid current at the second collection surface of the back-to-back collections surfaces.

A particular object of the present invention is to provide a method for removing suspended solids from a flowable composition inflowing into a sewage and wastewater treatment tank. The flowable composition may comprise solids, and suspended solids suspended in liquid, creating an outflowing liquid substantially free of the suspended solids. The method comprises the following steps. Placing within the treatment tank a suspended solids precipitation apparatus comprising a plurality of collection panels assembled onto a frame assembly. The frame assembly holds each of the collection panels in predetermined positions relative each to the other and spaced from surfaces defining the treatment tank. Creating within the treatment tank by the placing of the precipitation apparatus, a plurality of adjacent alternately directed low resistance flow paths ultimately directing the liquid from an inflow end to an outflow end of the treatment tank. The plurality of collection panels each has textured back-to-back collection surfaces and a plurality of perforations therethrough. The perforations provide a level of resistance to a perpendicular liquid flow path. The perpendicular high resistance flow path being substantially perpendicular to the flow direction of each of the low resistance liquid flow paths. The texturing of the collection surfaces, the perforations and the high and low resistance flow of the liquid causes a turbulent flow zone proximate each of the back-to-back collection surfaces. And the turbulent flow zone in combination with each of the textured back-to-back collection surfaces causes (at least in part) the precipitating of the suspended solids onto each of the collection surfaces thereby forming localized globules. The localized globules become a size and weight to be no longer suspendible in the liquid thereby producing the outflowing liquid, now sometimes called effluent, to be substantially free of suspended solids.

These and further objects of the present invention will become apparent to those skilled in the art to which this invention pertains and after a study of the present disclosure of the invention.

DESCRIPTION OF THE PREFERRED EMBODIMENTS

Figure 1:
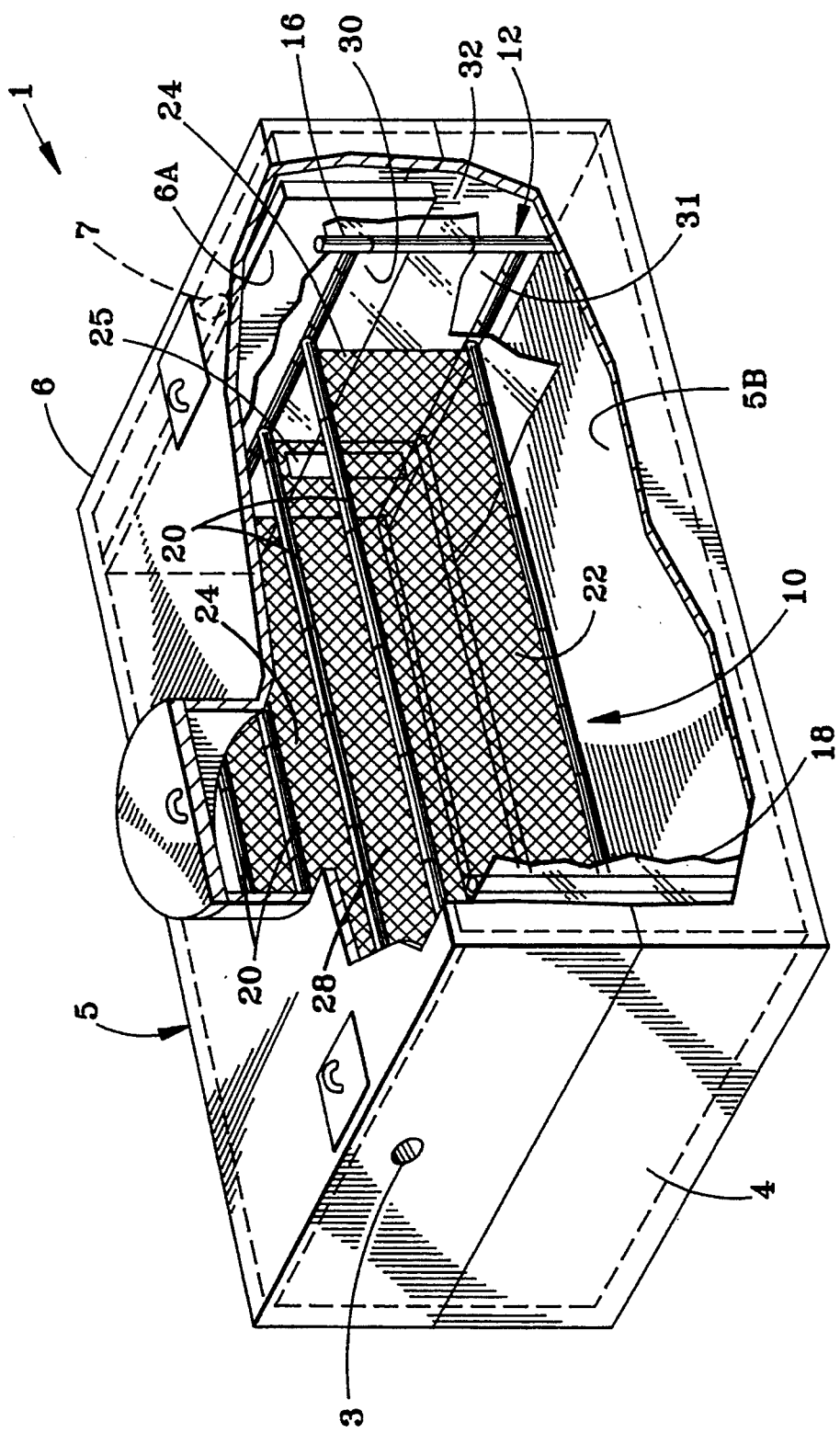
FIG. 1 is a perspective illustration of the precipitation apparatus in-place within a particularly configured septic tank with a portion of the tank cut-a-way.
Figure 2:
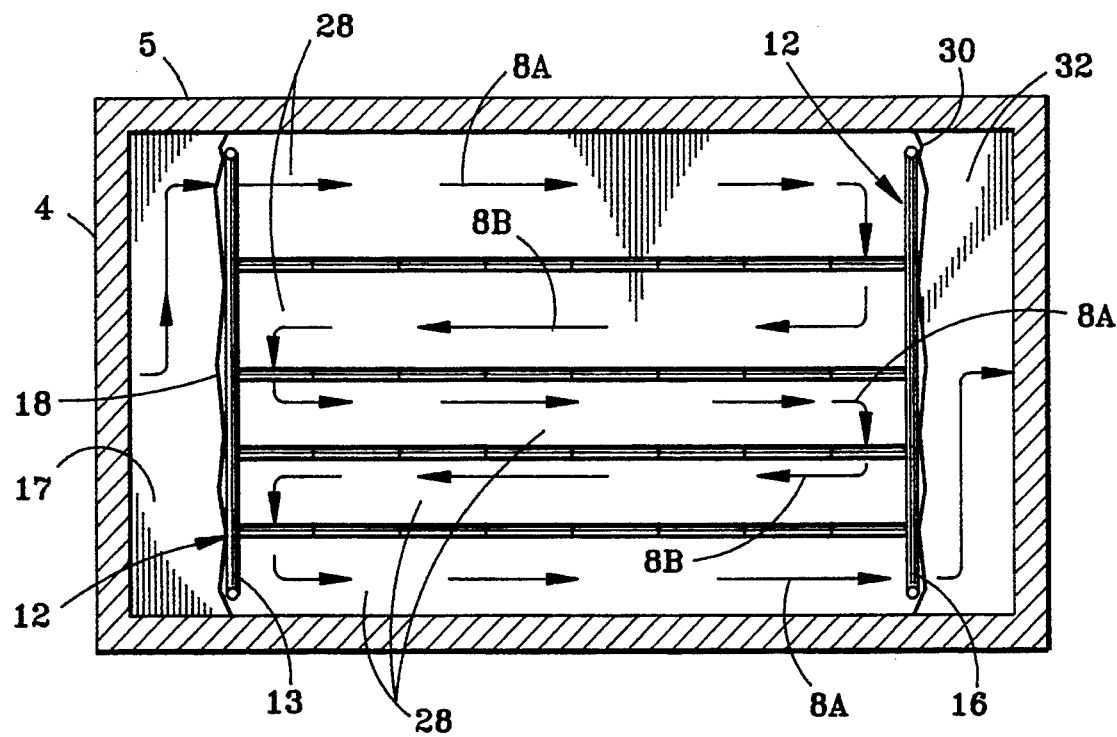
FIG. 2. is a top view of the precipitation apparatus, the treatment tank is in cross section and illustrating the undulating liquid flow paths through the precipitation chambers.
Figure 3:
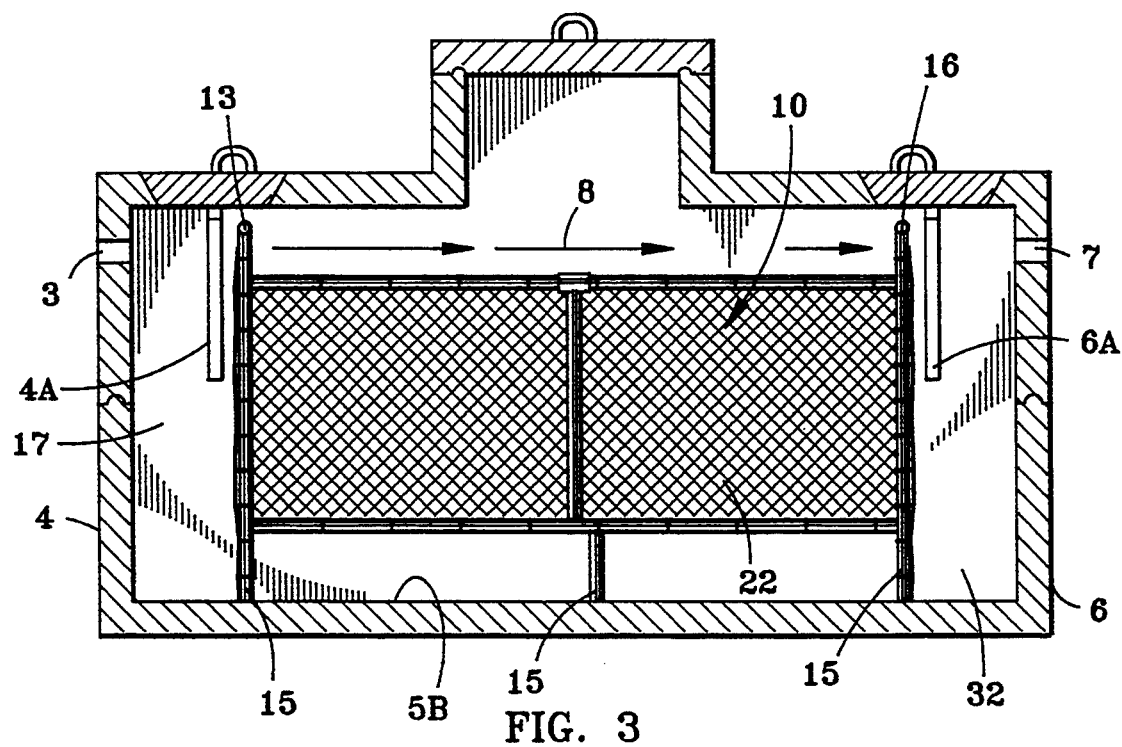
FIG. 3. is a side view of the precipitation apparatus, the treatment tank is in cross section illustrating the collection surface of a collection panel.
Figure 4:
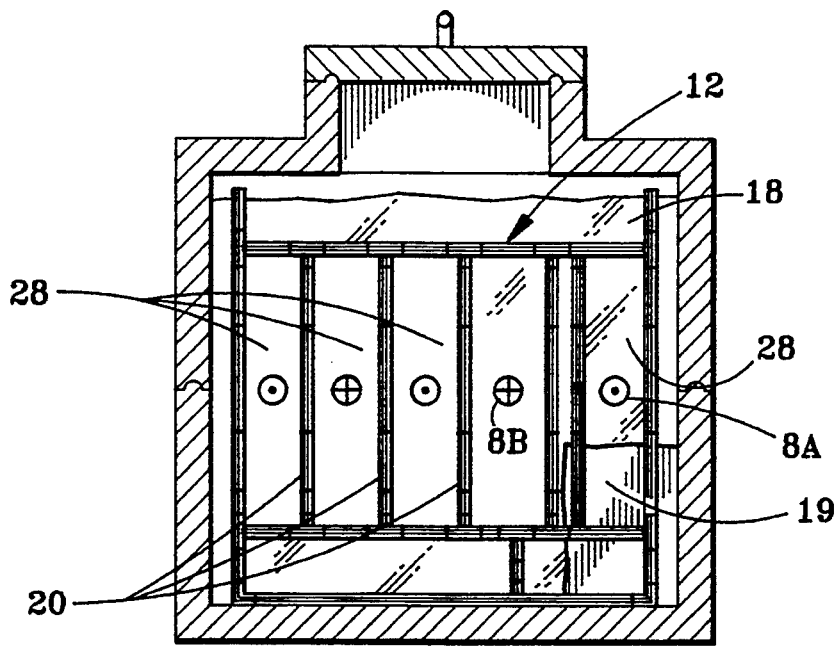
FIG. 4. is an end view of the precipitation apparatus, the treatment tank is in cross section illustrating the relative orientation and location of the collection panels.

The following is a description of the preferred embodiment of the invention. It is clear that there may be variations in the size and the shape of the apparatus, in the materials used in the construction and in the orientation of some of the components of the precipitation apparatus. However, the main features of the precipitation apparatus are consistent and are; the removal of suspended solids from septic tank liquid by precipitation of these solids onto collection surfaces of collection panels and providing the collection surface with surface texture characteristics such that the solids which were suspended in the liquid precipitate onto the collection surface in localized globules which become sufficiently large so as to no longer be suspendible within the liquid and because of the size and the mass and density of the localized globules, they will break away from the textured collection surfaces and either fall to the bottom of the septic tank or will float to the surface. Whatever takes place, the point is that what solids were suspended within the septic tank liquid have been removed from the liquid and are retained within the treatment tank. Normal and convention cleaning, typically pumping, of the treatment tank will remove these globules either from the tank bottom or from the surface of the liquid. A substantial portion of the suspended solids are kept form getting into the leaching system where they would adversely affect the performance of the leach field. The septic tank maze and the method of precipitating out solids suspended within the liquid flowing into a septic tank or treatment tank is effective in not permitting these solids into subsequent treatment such as leach fields.

Reference is now made to FIGS. 1–4 all of which illustrate by sketch a particular treatment system 1. System 1 is shown consisting of treatment tank 5, (typically a septic tank) within which is positioned precipitation apparatus 10. Treatment tank 5 has an inflow end 4 with an inflow aperture 3 through which a flowable composition of solids and liquid enter input chamber 17. Input chamber 17 is formed by tank inflow end 4 and an inlet end flow directing member 18 (schematically shown as a plastic sheet material) of precipitation apparatus 10. At one end of member 18 is an inlet flow directing aperture 19 which directs the liquid into at least one precipitation chamber 28. Precipitation chambers, all referenced by number 28, are defined by either walls of tank 5 (side walls for the embodiment of FIGS. 1–6 and end walls for the embodiment illustrated in FIGS. 7–9) and/or collection panels 20.

Collection panels 20 are mounted onto a means for holding 12 the panels 20 such as, for example, a frame assembly of plastic tubing. Means for holding and frame assemblies of obviously various designs and forms are all referred to by numeral 12. Clearly the frame assembly 12 could be made from plastic (or other suitable material) round tubing or rectangular tubing. The frame assembly 12 could also be incorporated as a part of the construction of panels 20 and inlet flow directing member 48 and outlet flow directing member 70 thereby creating precipitation apparatus 40 illustrated by FIGS. 5 and 6. The collection panels 20 are assembled onto frame assembly 12 and, if appropriate, spacer members 14 and leg members 15 are also used. Inlet end and outlet end flow directing members 18 and 30, if they are used in the particular treatment system, are attached to frame assembly inlet end 13 and frame assembly outlet end 16. The now completed precipitation apparatus 10 is placed within septic tank 5. Panels 20 are kept off of tank bottom 5B by legs 15 if they are needed because of the construction and size of panels 20.

Liquid entering aperture 3 ultimately flows toward outflow aperture 7 of tank 5. This liquid flowthrough direction is designated by numeral 8. The liquid directed into a chamber 28 will flow parallel to direction 8 and is the current flow direction 8A. Proximate to outlet end 16 of frame assembly 12 panel 20 has a flow directing aperture 25 to direct liquid into another precipitation chamber 28. The liquid flows in counter-current direction 8B toward inlet end 13 where another panel 20 has a flow directing aperture 25 to direct liquid into still another precipitation chamber 28 which chamber 28 is again created by either two adjacent panels 20 or by a panel 20 and a wall of tank 5. Clearly then the liquid is caused to flow in an undulating path contacting back-to-back collection surfaces 24 and 26 of collection panels 20. The flow direction of the liquid contacting one of the surfaces is opposite the flow direction of the liquid contacting the other surface of the back-to-back surfaces 24 and 26. Liquid is finally caused to enter output chamber 32 through outlet flow directing aperture 31 which is located through outlet flow directing member 30 (schematically shown as a plastic sheet material). Member 30 and outflow end 6 of tank 5 define output chamber 32. It is noted that the undulating flow path, the combination of current and counter-current flow directions 8A and 8B and the number of precipitation chamber 28 all tend to slow the flow rate of the liquid through treatment tank 5. This reduction in flow rate allows for slower and longer duration of liquid contact with collection surfaces 24 and 26 of plurality of collection panels 20 (or collection panels 50 according to FIGS. 5 and 6). It is believed that the combination of counter-current flow across mesh 22 and the texturing by the mesh geometry creating the textured collection surfaces 24 and 26 causes a zone of turbulence near the surface of collection surfaces 24 and 26. It is believe that this turbulence and surface texture, at least in part, causes the precipitation of the suspended solids onto collection surfaces 24 and 26, the localized globules forming and the subsequent dislodging the the globules which fall to the tank bottom or float to the surface of the liquid.

Collection panels 20 and the surfaces 24 and 26 thereof are textured. That is to say, the surfaces are not solid and they are not smooth. Mesh 22 of various sizes and of various materials such as polypropylene, high density polyethylene, nylon, cotton, metals or any other materials suitable for performing the function of being immersed into the liquid and for precipitating thereon suspended solids contained within the liquid, may be used. The material for mesh 22 and the size and shape of mesh apertures 21 will be a function of the particular treatment application for which treatment system I is to be used. In the embodiment of FIGS. 1–4 collection panel surfaces 24 and 26 create planes which are substantially parallel to liquid flowthrough direction line 8.

Figure 5:
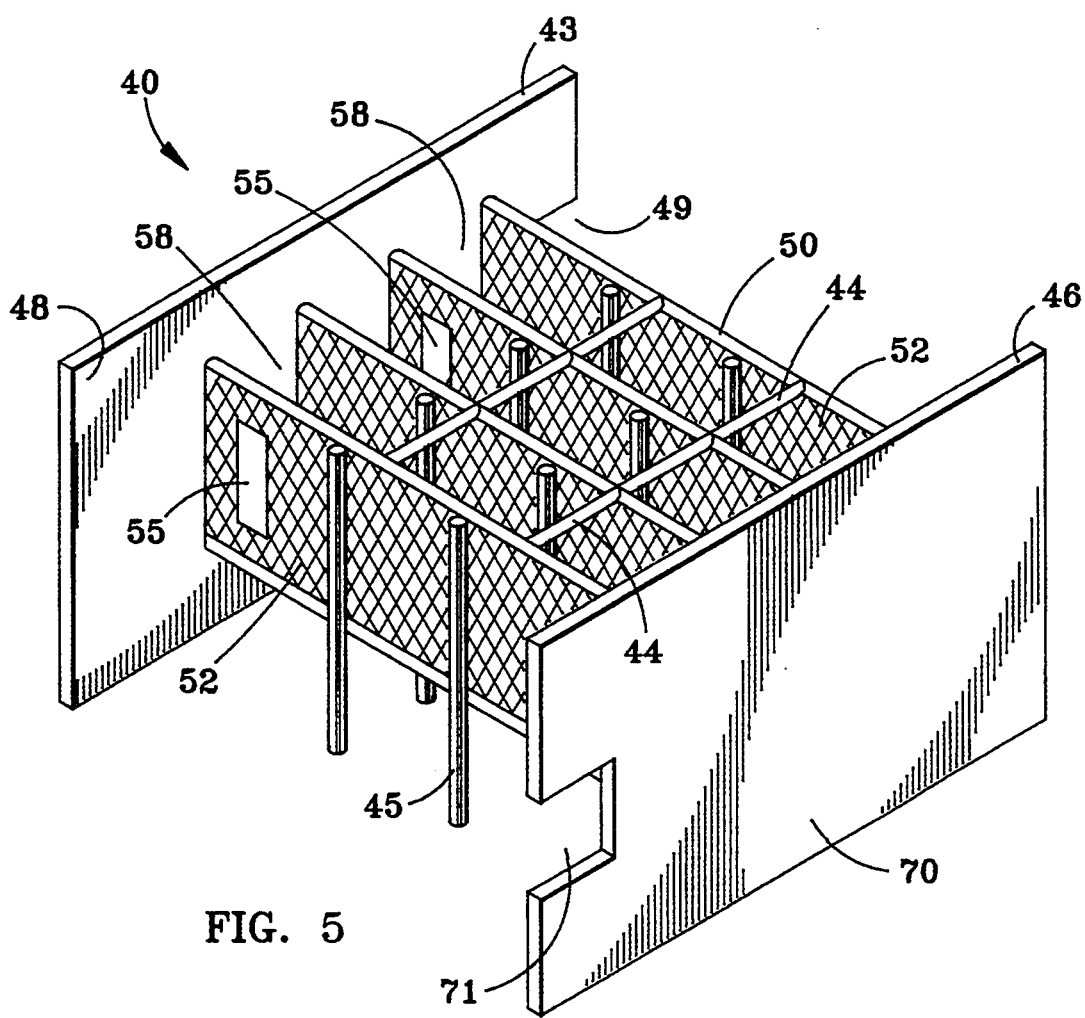
FIG. 5 is a perspective schematic illustration of an embodiment of the precipitation apparatus wherein the frame assembly is incorporated as a part of the construction of the panels and the inlet flow directing member and the outlet flow directing member.
Figure 6:
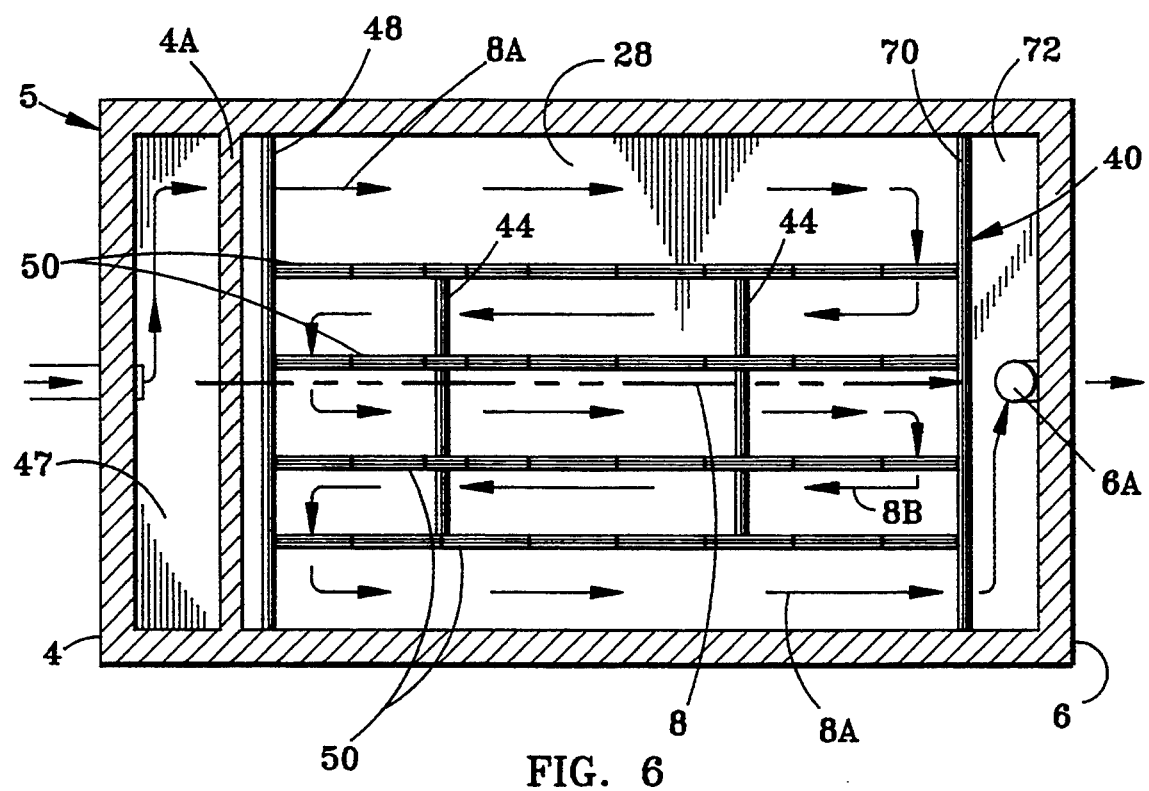
FIG. 6 is a top cross section view of an embodiment of the precipitation apparatus placed within a treatment tank and illustrating chambers and liquid flow directions.

FIGS. 5 and 6 illustrate another embodiment of precipitation apparatus 40. In apparatus 40 inlet flow directing member 48 and outlet flow directing member 70 in connection with collection panels 50 create frame assembly identified by numeral 52. Spacer members 44 maintain panels 50 in spaced relationship and leg members 45 keep apparatus 40 up from tank bottom 5B. Panel flow directing apertures 55 are located in alternate ends of the panels 50 when they are affixed to flow directing members 48 and 70. Inlet flow directing aperture 49 is located at inlet end 43 of assembly 52 and is preferentially located at a position on inlet flow directing member 48 to direct liquid into at least one precipitation chamber 58. Liquid flows in an undulating path through the plurality of precipitation chambers 58, directions 8A and 8B finally through outlet flow directing aperture 71 at outlet end 46 of assembly 52 and is preferentially located at a position on outlet flow directing member 70 to direct liquid into output chamber 32. The liquid now, substantially without suspended solids will pass by tank outlet baffle 6A (illustrated as a vertically directed pipe opening toward tank bottom 5B and which opening is usually below liquid surface level to keep floating material with tank 5) and through aperture 7. Tank inflow baffle 4A and outflow baffle 6A primarily inhibit or prevent the outflow of solids and do not have an effect on suspended solids.

Figure 7:
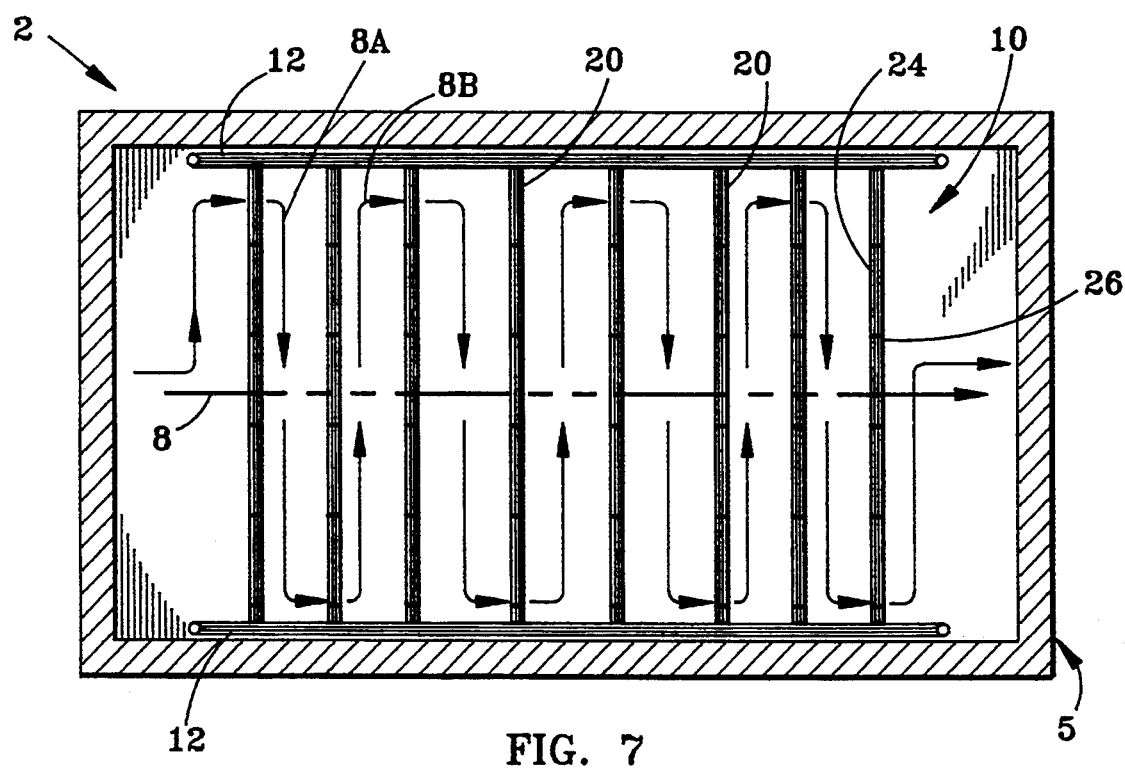
FIG. 7. is a top view of another embodiment of the precipitation apparatus, the treatment tank is in cross section and illustrating the undulating liquid flow paths through the precipitation chambers which undulating flow paths are about perpendicular to the liquid flow-through direction.
Figure 8:
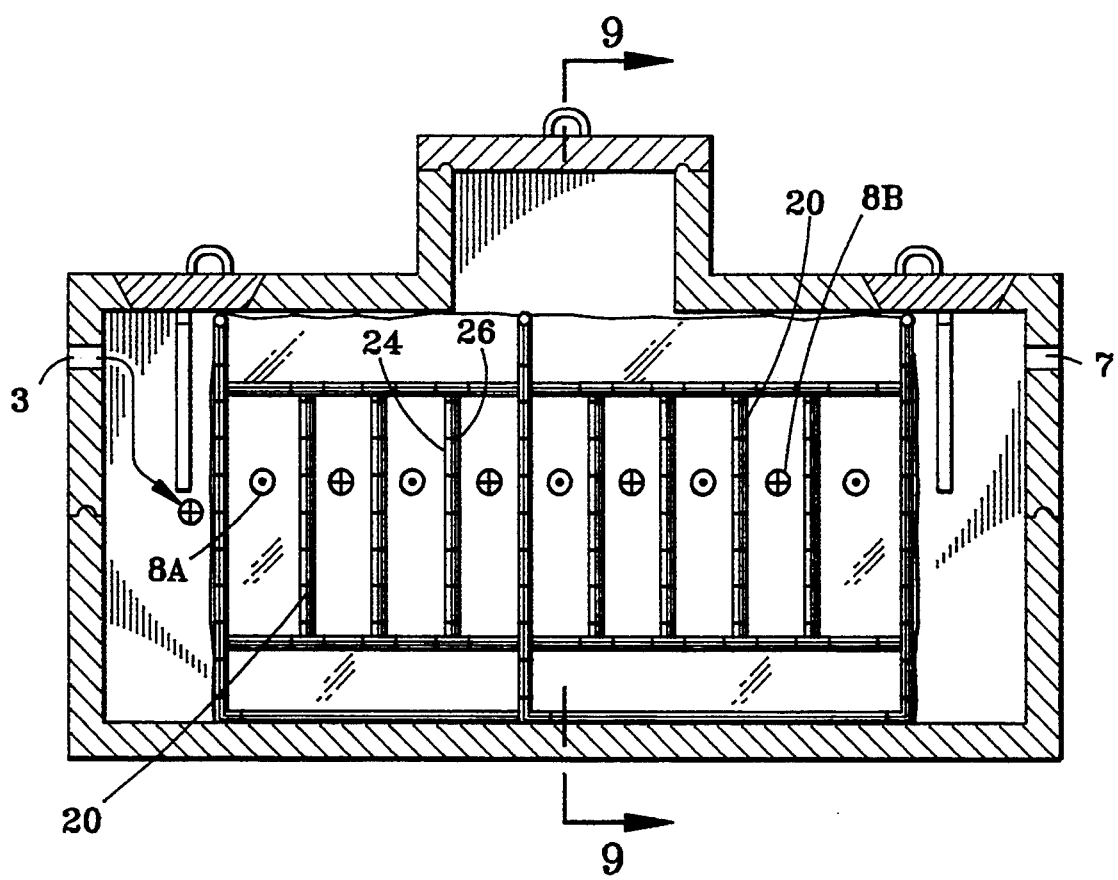
FIG. 8. is a side view of the precipitation apparatus of FIG. 7, the treatment tank is in cross section illustrating the collection surface of a collection panel.
Figure 9:
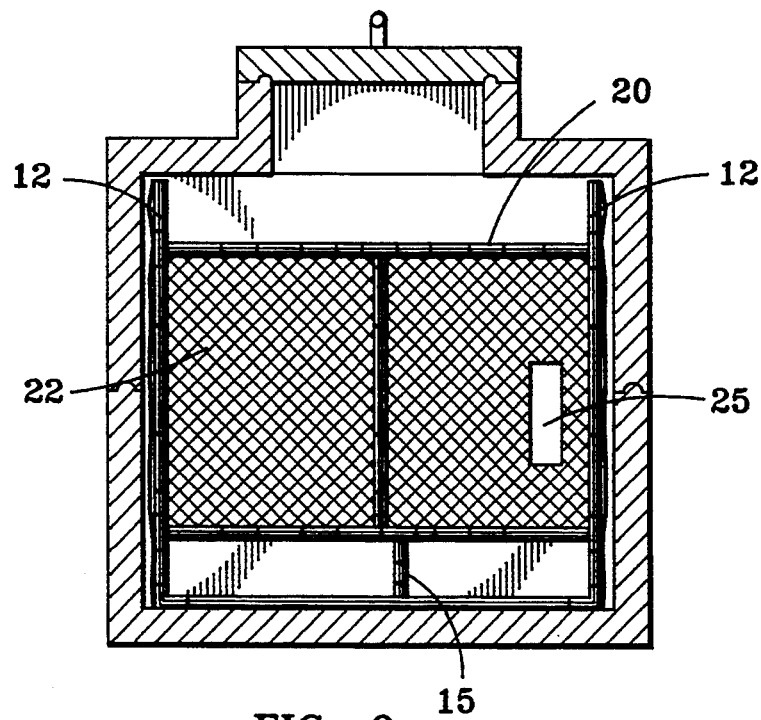
FIG. 9. is an end view of the precipitation apparatus of FIGS. 7 and 8, the treatment tank is in cross section illustrating the relative orientation and location of the collection panels.

FIGS. 7–9 illustrate another embodiment of the precipitation apparatus 10 wherein surfaces 24 and 26 are not parallel to flow direction 8 but are instead orthogonal. All of the apparatus is substantially as described relative to FIGS. 1–4 and FIGS. 5 and 6 except that direction of flow of the current 8A and counter-current 8B both are perpendicular to flowthrough direction 8. Panels 20 so oriented within tank 5 will provide surfaces upon which suspended solids will precipitate form localized globules which reach a size and density so as to break away or dislodge from surfaces 24 and 26 and either fall to the bottom of the tank 5 or float on the surface of the liquid contained within the tank 5. The point being that the suspended solids are taken out of solution and thus do not leave tank 5 and go into a leach system.

Figure 10:
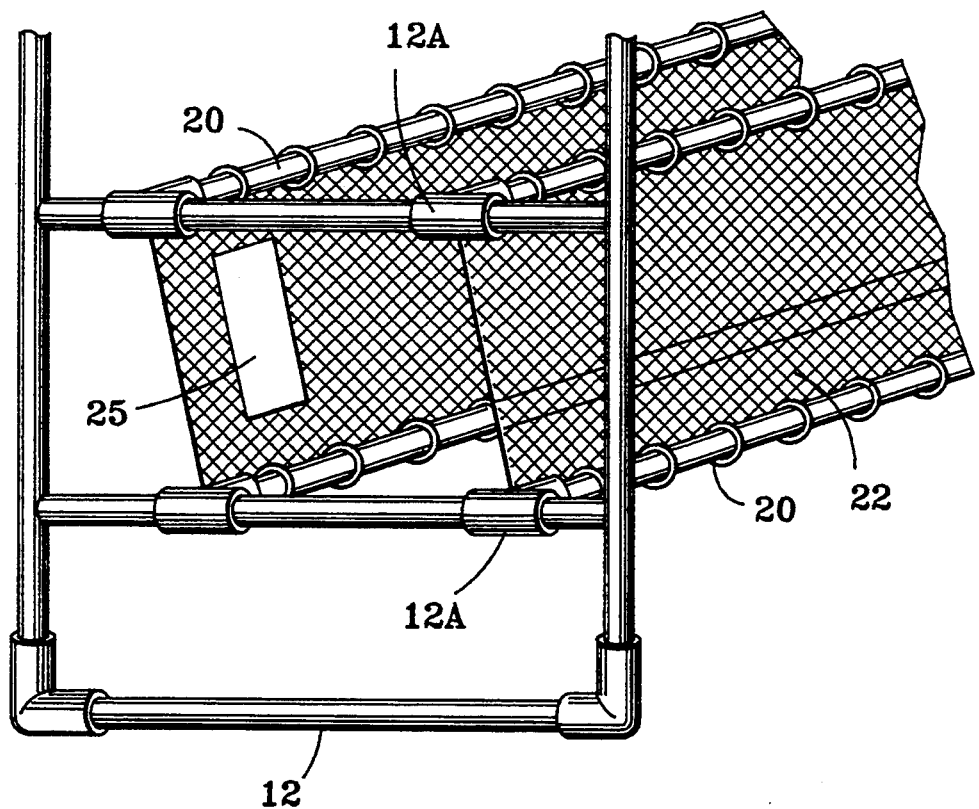
FIG. 10 schematically illustrates collection panels 20 oriented at preselected angles keeping collection surfaces parallel to the liquid flow direction and using slideable assembly components which permit panels to be placed angularly with respect to the tank bottom and tie loops are illustrated for attaching the mesh to form the collection surfaces.
Figure 11:
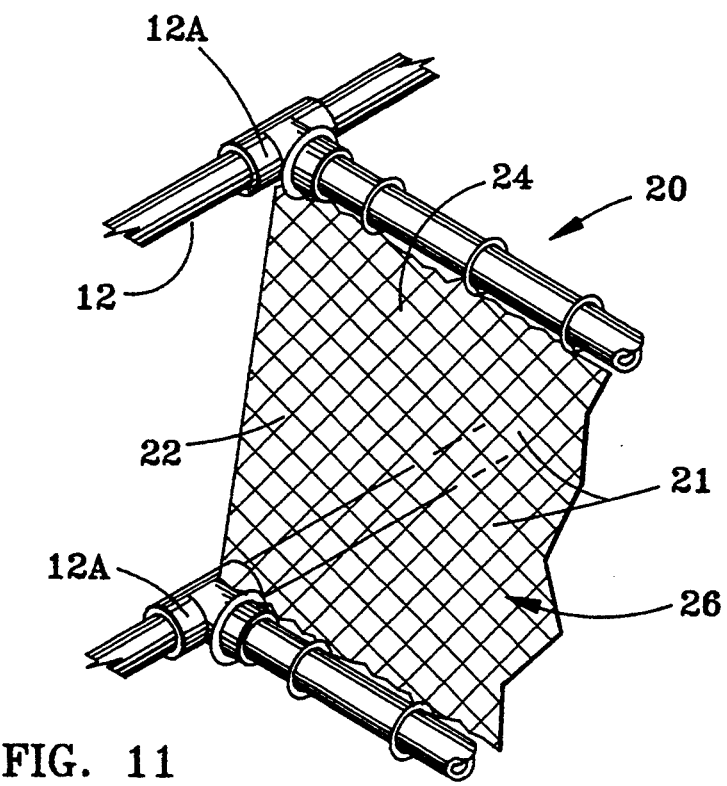
FIG. 11 is a cut-a-way view schematically illustrating a portion of one collection panel oriented at a preselected angle and showing the direction of the slideable motion.

FIGS. 10 and 11 schematically illustrate collection panels 20 oriented at preselected angles to tank bottom 5B however, collection surfaces 24 and 26 are again parallel to flow direction 8. Slideable assembly components 12A permit panels 20 to be placed angularly with respect to tank bottom 5B. Tie loops are illustrated for attaching mesh 22 to form collection surfaces 24 and 26.

It is thought that the present invention, the method and the apparatus for method of and the device/apparatus for use in precipitating out—not filtering out—suspended solids, particularly those found in septic tanks and many of its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A method for removing suspended solids from a flowable composition inflowing into a sewage and wastewater treatment tank, said flowable composition may comprise solids, and suspended solids suspended in liquid, creating an outflowing liquid substantially free of said suspended solids, said method comprising the steps of:

placing within said treatment tank a suspended solids precipitation apparatus comprising a plurality of collection panels assembled onto a frame assembly said frame assembly holds each said collection panels in predetermined positions relative each to the other and spaced from surfaces defining said treatment tank;

creating within said treatment tank by said placing of said precipitation apparatus, a plurality of adjacent alternately directed low resistance flow paths ultimately directing said liquid in parallel flow within said low resistance flow paths from an inflow end to an outflow end of said treatment tank said plurality of collection panels each having textured back-to-back collection surfaces and a plurality of perforations therethrough said perforations providing a level of resistance to a perpendicular liquid flow path, said perpendicular high resistance flow path being substantially perpendicular to flow direction of each said low resistance liquid flow paths;

said texturing of said collection surfaces, said perforations and said high and low resistance flow of said liquid causing a turbulent flow zone proximate each of said back-to-back collection surfaces; and said turbulent flow zone in combination with each said textured back-to-back collection surfaces causing the precipitating of said suspended solids onto each of said collection surfaces thereby forming localized globules, said localized globules becoming of a size and weight to be no longer suspendible in said liquid thereby producing said outflowing liquid substantially free of said suspended solids.

2. A suspended solids precipitation apparatus comprising:

a sewage and wastewater treatment tank having selected interior dimensions, having an inflow end with an inflow aperture defined therein, an outflow end with an outflow aperture defined therein;

at least one collection panel sized and configured to be removably placeable within said sewage and wastewater treatment tank, each said collection panel having back-to-back collection surfaces, each said collection surfaces having a surface texture which promotes said precipitation thereon of said suspended solids; and said means for holding in a substantially predetermined and subsequently fixed location and orientation each of said at least one collection panels such that said collection surfaces are substantially parallel to a liquid flowthrough direction, said liquid flowthrough direction defined by a direction line connecting said inflow aperture to said outflow aperture, and wherein said at least one located and oriented collection panel defining thereby a plurality of precipitation chambers when said precipitation apparatus is placed within said treatment tank, said at least one collection panel so oriented, by said means for holding, permitting flow through of said liquid in said liquid flowthrough direction from said inflow end to said outflow end of said treatment tank and said precipitation of said suspended solids onto said collection surfaces, and said surface texture of each said collection surfaces is a mesh having a plurality of apertures therethrough, said apertures each having a selected area measure, said area measure selected being a function of material characteristics of said suspended solids.

3. The suspended solids precipitation apparatus according to claim 2 wherein said means for holding further comprises a plurality of collection panel spacer members and a plurality of leg members, said leg members and said spacer members adapted to locate and maintain said location of 4. The suspended solids precipitation apparatus according to claim 3 wherein said means for holding orients each said at least one collection panel in a manner such that said collection surfaces are substantially vertical to a bottom surface of said treatment tank and each collection panel having a flow directing aperture therethrough.

5. The suspended solids precipitation apparatus according to claim 2 wherein said mesh having a plurality of apertures therethrough is selected from at least one of the materials selected from the group consisting of nylon mesh, metallic mesh, plastic mesh, fiberglass mesh, fabric mesh, woven wood and plastic.

6. The suspended solids precipitation apparatus according to claim 2 further comprising an inlet end flow directing member removably attached to an inlet end of said means for holding, having defined therethrough an inlet flow directing aperture, said inlet flow directing aperture located to direct said liquid into at least one precipitation chamber of said plurality of precipitation chambers, said inlet end flow directing member and said inflow end of said treatment tank defining an input chamber when said precipitation apparatus is placed within said treatment tank.

7. The suspended solids precipitation apparatus according to claim 6 further comprising an outlet end flow directing member removably attached to an outlet end of said means for holding, having defined therethrough an outlet flow directing aperture, said outlet end flow directing member and said outflow end of said treatment tank defining an output chamber when said precipitation apparatus is placed within said treatment tank, said outlet flow directing aperture located to direct said liquid into said output chamber.

8. A suspended solids precipitation apparatus comprising:
   a sewage and wastewater treatment tank having selected interior dimensions, having an inflow end with an inflow aperture defined therein, an outflow end with an outflow aperture defined therein;
   a plurality of collection panels sized and configured to be removably placeable within said sewage and wastewater treatment tank, each said collection panel, each having back-m-back collection surfaces, each said collection surfaces having a surface texture which promotes said precipitation thereon of said suspended solids and each collection panel having a flow directing aperture therethrough; and
   means for holding in a substantially predetermined and subsequently fixed location and orientation each of said plurality of collection panels such that said collection surfaces are substantially parallel to a liquid flowthrough direction, said liquid flowthrough direction defined by a direction line connecting said inflow aperture to said outflow aperture and wherein said plurality of located and oriented collection panels defining thereby a plurality of adjacent precipitation chambers such that said adjacent precipitation chambers have low resistance liquid flow directions which are substantially countercurrent each to the other, said countercurrent flow directions created by said collection panel flow directing apertures being alternately located at said inflow end and said outflow end of said treatment tank when said precipitation apparatus is placed within said treatment tank, said plurality of collection panels so oriented, by said means for holding, permitting flow through of said liquid in said liquid flowthrough direction from said inflow end to said outflow end and permitting said precipitation of said suspended solids onto each said collection surfaces, and
   said surface texture of each said collection surfaces is a mesh having a plurality of apertures therethrough, said apertures each having a selected area measure, said area measure selected being a function of material characteristics of said suspended solids.

9. The suspended solids precipitation apparatus according to claim 8 wherein said means for holding further comprises a plurality of collection panel spacer members and a plurality of leg members, said leg members and said spacer members adapted to locate and maintain said location of said plurality of collection panels within said treatment tank.

10. The suspended solids precipitation apparatus according to claim 9 wherein said means for holding orients each said plurality of collection panels in a manner such that at least two of said collection surfaces are substantially vertical to a bottom surface of said treatment tank.

11. The suspended solids precipitation apparatus according to claim 8 wherein said mesh having a plurality of apertures therethrough is selected from at least one of the materials selected from the group consisting of nylon mesh, metallic mesh, plastic mesh, fiberglass mesh, fabric mesh, woven wood and plastic.

12. The suspended solids precipitation apparatus according to claim 8 further comprising an inlet end flow directing member removably attached to an inlet end of said means for holding, having defined therethrough an inlet flow directing aperture, said inlet flow directing aperture located to direct said liquid into a first precipitation chamber of said plurality of precipitation chambers, said inlet end flow directing member and said inflow end of said treatment tank defining an input chamber when said precipitation apparatus is placed within said treatment tank.

13. The suspended solids precipitation apparatus according to claim 12 further comprising an outlet end flow directing member removably attached to an outlet end of said means for holding, having defined therethrough an outlet flow directing aperture, said outlet end flow directing member and said outflow end of said treatment tank defining an output chamber when said precipitation apparatus is placed within said treatment tank, said outlet flow directing aperture located to direct said liquid from a last precipitation chamber into said output chamber.

14. A suspended solids precipitation apparatus comprising:
   a sewage and wastewater treatment tank having selected interior dimensions, having an inflow end with an inflow aperture defined therein, an outflow end with an outflow aperture defined therein, a liquid flowthrough direction, said liquid flowthrough direction defined by a direction line connecting said inflow aperture to said outflow aperture;
   a plurality of collection panels sized and configured to be removably placeable within said sewage and wastewater treatment tank, each said collection panel having two back-to-back collection surfaces, each said collection surfaces having a surface texture which promotes said precipitation thereon of said suspended solids and each collection panel having a flow directing aperture therethrough;
   means for holding in a substantially predetermined and subsequently fixed location and orientation each of said plurality of collection panels such that said collection surfaces are substantially perpendicular to said liquid flowthrough direction, and wherein said plurality of located and oriented collection panels defining thereby a plurality of adjacent precipitation chambers such that said adjacent precipitation chambers have low resistance liquid flow directions which are substantially countercurrent each to the other and substantially parallel to each said collection panels and substantially perpendicular to said liquid flowthrough direction, said countercurrent flow directions created by said collection panel flow directing apertures being alternately located at each of a right and left side of said treatment tank when said precipitation apparatus is placed within said treatment tank, said plurality of collection panels so oriented, by said means for holding, permitting flow through of said liquid in said liquid flowthrough direction from said inflow end to said outflow end and permitting said precipitation of said suspended solids onto each said collection surfaces, said surface texture of each said collection surfaces is a mesh having a plurality of apertures therethrough, said apertures each having a selected area measure, said area measure selected being a function of material characteristics of said suspended solids.

15. The suspended solids precipitation apparatus according to claim 14 wherein said means for holding further comprising a plurality of collection panel spacer members and a plurality of leg members, said leg members and said spacer members adapted to locate and maintain said location of said plurality of collection panels within said treatment tank, 16. The suspended solids precipitation apparatus according to claim 14 wherein said means for holding orients each said plurality of collection panels in a manner such that at least two of said collection surfaces are substantially vertical to a bottom surface of said treatment tank, 17. The suspended solids precipitation apparatus according to claim 14 wherein said mesh having a plurality of apertures therethrough is selected from at least one of the materials selected from the group consisting of nylon mesh, metallic mesh, plastic mesh, fiberglass mesh, fabric mesh, woven wood and plastic.

18. The suspended solids precipitation apparatus according to claim 14 further comprising an inlet end flow directing member removably attached to an inlet end of said means for holding, having defined therethrough an inlet flow directing aperture, said inlet flow directing aperture located to direct said liquid into a first precipitation chamber of said plurality of precipitation chambers, said inlet end flow directing member and said inflow end of said treatment tank defining an input chamber when said precipitation apparatus is placed within said treatment tank, 19. The suspended solids precipitation apparatus according to claim 18 further comprising an outlet end flow directing member removably attached to an outlet end of said means for holding, having defined therethrough an outlet flow directing aperture, said outlet end flow directing member and said outflow end of said treatment tank defining an output chamber when said precipitation apparatus is placed within said treatment tank, said outlet flow directing aperture located to direct said liquid from a last precipitation chamber into said output chamber.

* * * * *